E. C. STEARNS.
FAUCET.
APPLICATION FILED MAR. 17, 1914.
1,169,519.
Patented Jan. 25, 1916.
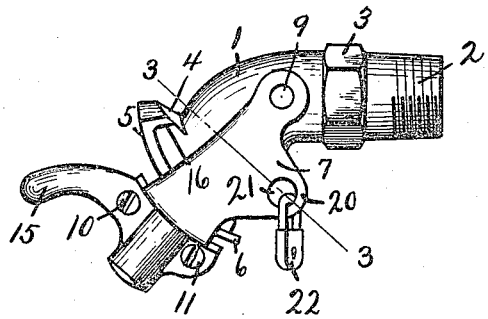
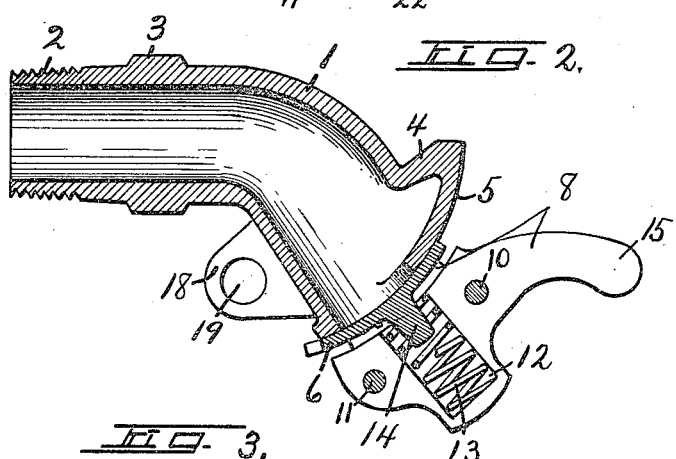
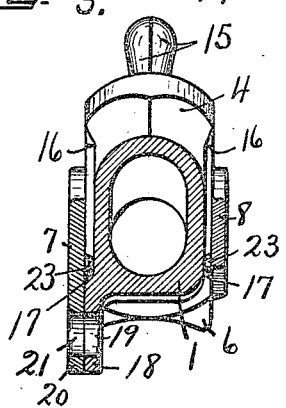
WITNESSES:
INVENTOR.
Edward C. Stearns
BY
Howard P. Denison
ATTORNEY.
THE COLUMBIA PLANOGRAPH CO., WASHINGTON, D. C.

UNITED STATES PATENT OFFICE.

EDWARD C. STEARNS, OF SYRACUSE, NEW YORK.

FAUCET.

1,169,519.
Specification of Letters Patent.
Patented Jan. 25, 1916.

Application filed March 17, 1914. Serial No. 825,205.

*To all whom it may concern:*

Be it known that I, EDWARD C. STEARNS, of Syracuse, in the county of Onondaga, in the State of New York, have invented new and useful Improvements in Faucets, of which the following, taken in connection with the accompanying drawings, is a full, clear, and exact description.

This invention relates to certain improvements in faucets, and more particularly to faucets for controlling the drawing off of liquid material from barrels or other receptacles, although it is susceptible of use in any connection in which faucets are ordinarily used.

The primary object of the invention is to provide means for locking the faucet in the closed position of its valve or gate to prevent operation of the faucet either accidentally or by other than the particular person or persons having means for operating the locking device.

A secondary object relates to the particular construction, position and manner of operation of the portions of the faucet adapted to receive the locking device, which device may be of any known form and construction consistent with the particular embodiment of this invention in connection with which it is used.

In the drawings—Figure 1 is a side elevation of a faucet illustrating one particular form constructed in accordance with this invention. Fig. 2 is a longitudinal central cross section of the same. Fig. 3 is a cross section on line 3—3 of Fig. 1.

The form of device illustrated in the drawings comprises a tubular body portion —1— having a threaded rear end —2— for engagement with the wall of a receptacle, pipe or other liquid-containing or conveying device not herein necessary to illustrate or describe. The outer wall of the body portion —1— has an angular portion —3— forming a nut preferably positioned adjacent the threaded portion —2—. The forward end of the body —1— is provided with a laterally offset portion —4— and a returned face portion —5—, preferably slightly curved in cross section and extending partially across the delivery end of the faucet and forming a seat for a sliding swinging gate or valve —6— operated by a swinging support formed of opposite angular half sections —7— and —8—. One end of each of the sections —7— and —8— is positioned or journaled upon lugs —9— formed upon opposite sides of the body —1— and the other ends of said sections are disposed across the delivery end of the faucet and connected together by means of bolts or screws —10— and —11—. Each of said sections —7— and —8— at its meeting face with the other section is provided with a semi-cylindrical recess —12—, said recesses registering to form a cylindrical seat for a helical spring —13— disposed around a projection —14— upon the gate or valve —6— and bearing against the gate or valve to hold it in liquid-tight relation with the end wall of the body —1— and the face portion —5—. Each of the sections —7— and —8— is likewise provided with a projection —15— uniting to form a handle by means of which the gate may be swung to and fro.

It will be noted that the spring, as shown clearly in Fig. 2, is spaced from the lug 15 so that the plate 6 has freedom to seat itself regardless of irregularities in wear. Each of these sections —7— and —8— is likewise provided with a lug —23— formed upon its inner face and adapted to slide across the body —1— and contact with or abut against the shoulders —16— and —17— formed at opposite sides of the body —1— for limiting the extent of movement of the swinging support and thereby the valve or gate —6—.

For the purpose of providing suitable means for receiving a locking device to prevent movement of the swinging support to open the valve or gate —6—, the body —1— is provided with a laterally projecting lug —18— having an opening or aperture —19— therethrough and disposed transversely of the path of movement of the gate, and one of the arms, as —7—, is provided with a coacting lug —20— having an opening —21— therethrough registering with the opening —19— when the valve —6— is in its closed position for the reception of a locking device such as the lock —22— adapted to prevent movement of the swinging support and thereby the gate —6—.

It will be apparent, however, that although I have illustrated and described a particular form of device constructed in accordance with this invention, that many changes may be made in the particular form, construction and arrangement of the means for receiving the locking device, without departing from the spirit of this invention as set forth in the appended claim.

What I claim is:

A faucet comprising a cylindrical casing having a substantially horizontal portion and a downwardly curved discharge end provided with a vertically elongated curved sliding face and a discharge orifice at the lower portion of said face, a curved slide valve for said opening having a laterally projecting boss, a swinging support for sliding said valve vertically comprising arms pivoted to opposite sides of the cylindrical casing to swing substantially about a center determined by the curvature of said sliding face, said arms connected together at their free ends and formed in a recess adapted to receive, and of greater diameter than, the boss upon said slide valve, a spring in said recess bearing against said slide valve to hold the same in liquid-tight relation with said sliding face and allowing the valve to tilt in adjusting itself to said sliding face, one of said arms provided with a lug projecting laterally therefrom between the pivot of the arm and the recess formed by the united arms and having a transverse opening, a lug projecting substantially tangentially from the cylindrical casing and lying between the pivot of the adjacent arm and said discharge opening and having a transverse opening adapted to register with the transverse opening in the lug formed upon the adjacent arm to receive a locking device for positively preventing operation of the faucet.

In witness whereof I have hereunto set my hand this 10th day of March, 1914.

EDWARD C. STEARNS.

Witnesses:
E. A. HURDMAN,
HENRY HAMMEKEN.

Copies of this patent may be obtained for five cents each, by addressing the "Commissioner of Patents, Washington, D. C."